(No Model.)
2 Sheets—Sheet 1.

J. F. LEE.
COMPLEMENTAL ACCIDENT INSURANCE POLICY.

No. 389,818.
Patented Sept. 18, 1888.

Fig. 1.

Witnesses
Inventor
James Francis Lee,
by Offield & Towle,
Attorneys.

N. PETERS. Photo-Lithographer, Washington, D. C.

(No Model.) 2 Sheets—Sheet 2.
J. F. LEE.
COMPLEMENTAL ACCIDENT INSURANCE POLICY.
No. 389,818. Patented Sept. 18, 1888.
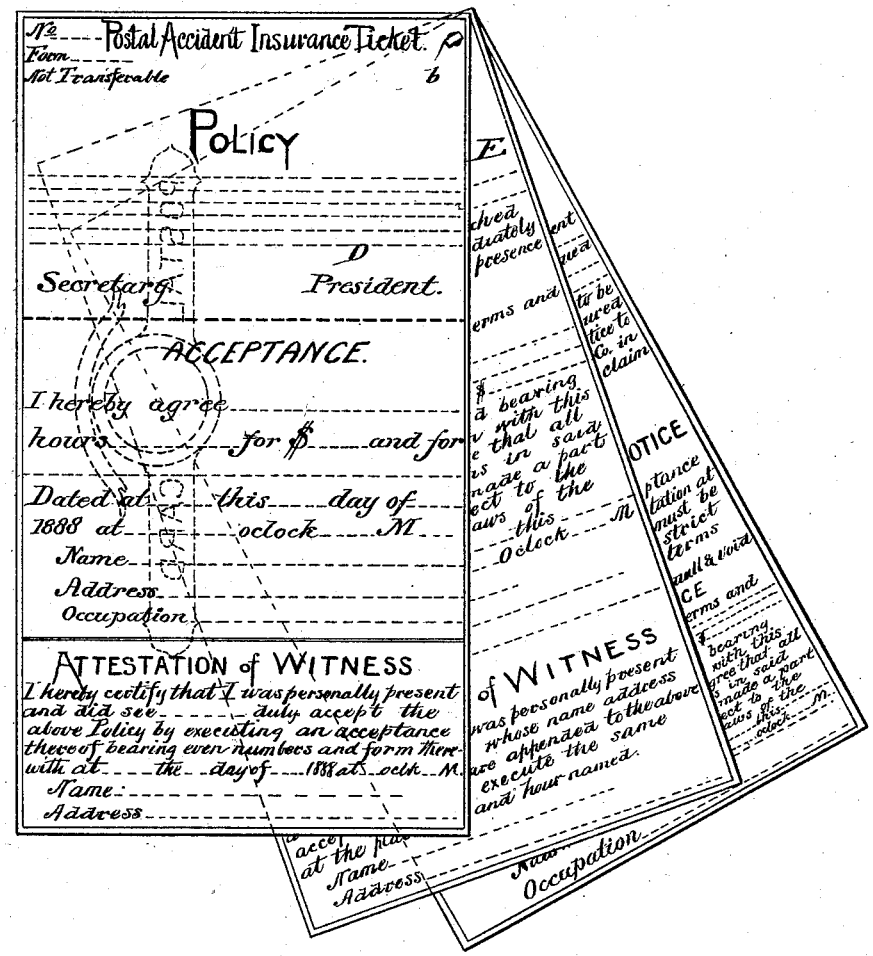

UNITED STATES PATENT OFFICE.

JAMES FRANCIS LEE, OF CHICAGO, ILLINOIS.

COMPLEMENTAL ACCIDENT INSURANCE POLICY.

SPECIFICATION forming part of Letters Patent No. 389,818, dated September 18, 1888.

Application filed January 19, 1888. Serial No. 261,325. (No model.) Patented in Canada April 16, 1888, No. 28,928.

*To all whom it may concern:*

Be it known that I, JAMES FRANCIS LEE, a subject of the Queen of Great Britain and Ireland, residing at Chicago, in the county of Cook and State of Illinois, have invented a certain new and useful Improvement in Complemental Accident Insurance Policies, (which I desire to protect by Letters Patent of the United States,) of which the following is a specification.

The subject-matter of my invention is disclosed in Canadian Patent No. 28,928 of April 16, 1888, granted to me.

The purpose of my invention is to enable insurance companies to furnish to the public accident policies in which, as one of the important features thereof, prevention is made against loss of evidence of the transaction; also a means is provided whereby the time at which the policy becomes effective may be optional with the purchaser, and further provides, generally, a more convenient and satisfactory system of accident insurance.

The usual method of issuing policies by accident insurance companies is to supply the purchaser of insurance with an instrument containing conditions, the time at which the risk begins, and everything that is obtained by the purchaser pertaining to the transaction embraced on a single card or slip. This the insured, who is about to take a journey, usually carries about the person for want of facilities for safer disposition of it. Thus in case of accident in which the destruction of personal effects by fire or loss by theft, or loss otherwise occurs, no instrument of evidence of insurance remains to the insured. My method of meeting the requirements of this class of insurance embraces provision for convenience in mailing the policy to the family or other custodians for safe keeping thereof, and also provides a complementary portion convenient for mailing to the company as an acceptance, whereby that feature embracing optional beginning of liability or force of the policy may be determined by the purchaser, and further embraces, as a preferable feature, a portion or complement to be retained by the insured. There are thus three elements of importance embraced in my system of issuing policies.

For a more detailed description, reference is had to the accompanying drawings, in which—

Figure 1 illustrates the elements of my invention in one form, and Fig. 2 is a modification thereof.

A and B represent cards suitable for mailing, preferably postal-cards, such as supplied by the United States Government and in common use. Between the adjacent ends of these cards is a coupon, C, that is so affixed thereto by adhesives or otherwise as to form the three parts into a single sheet that may be folded for convenience in carrying the same. One of the cards—A, for example—has printed upon it the policy, with the necessary signatures of the company's officers to make it effective under certain conditions. The other card, B, bears upon it printed conditions, by which the purchaser, upon compliance with provisions of the policy, accepts and puts in operation the company's liability in the matter.

To illustrate the plan by which the insurance is to be effected under my improved system, the company provides the complementary cards that will represent the three features of my invention, which may be purchased by one who contemplates insurance, the card or part A being ready to become effective as a policy at the option of the purchaser, for which a price is paid at the time proportionate to the amount named in the policy for which the company is to become liable to the insured or the latter's representatives in case of injury or death, and also proportioned to the length of time the liability is to run. Upon a small coupon, *a*, not to be detached from the policy-card, is a provision for entering date and hour of acceptance. The card A, after such affixing of date and hour as may be elected by the purchaser for beginning the life of the policy, may be detached and mailed to the family or other selected custodians thereof. The card B, at the same time being detached from the coupon C, may be forwarded by mail to the company by whom the policy was issued. At the time of accepting the policy the insured affixes his signature to the card B, which preferably should be witnessed, and also affixes the date and hour of acceptance. The residence of the insured and other matters desirable for the company's information may preferably have been affixed to the card B at the time of the sale of the policy. The coupon C, having printed upon it matter sufficient to identify it as one of the three elements constituting the policy, and also bearing date and hour of acceptance, is to be retained by the insured. The modification shown in Fig. 2 illustrates the three elements as consisting of cards D, E, and F, two of which, at least, should be suitable for ready mailing. The cards in the latter example are held together by a clip or fastening, b, at the corners, so as to permit the three to coincide in position or be separated by lateral movements of one upon another.

The form of means of attaching together the three portions or elements constituting my invention I do not deem important, providing the purpose is subserved for which such invention is designed in the manner substantially as set forth.

It is apparent from the foregoing description of my invention that the objections and obstacles to desirable accident insurance are obviated. The cards or slips, as set forth, may be issued to cover any desired amount of insurance or duration of time from the smallest amount and shortest time that could reasonably be desired to the largest amount and longest duration desired by the company and those contemplating insurance, and which, by the provisions set forth, may be made effective at any time by the person desiring insurance without the usual risk of evidence of the transaction being destroyed.

My invention does not depend simply upon the fact that auxiliary or supplemental parts are added to the policy, but upon this fact, in connection with the provision for convenient mailing of the main element—i. e., the policy, and also the acceptance. A further feature of importance, and one essential to the invention, has its foundation in the fact that the parts are complemental, so that one part may identify another.

The element (coupon C) may be omitted from the combination, without seriously impairing the usefulness of my complemental policies.

Having thus described my invention, what I claim, and desire to protect by Letters Patent, is—

1. A complemental insurance policy substantially as set forth, consisting of a card or slip having printed thereon the conditions, and having the underwriter's signature thereto, and space or spaces for affixing the date or time of acceptance, also a card having printed thereon matter so complemental of the first as to identify it as a portion thereof, with space suitably provided for affixing the signature of the insured, and space for affixing the date and hour of acceptance, said cards being secured together with provision for ready separation and adapted for address and mailing without further provision therefor.

2. A complemental insurance policy substantially as set forth, consisting of a card or slip having printed thereon the conditions, and having the underwriter's signature thereto, and space or spaces for affixing the date or time of acceptance, also a card having printed thereon matter so complemental of the first as to identify it as a portion thereof, with space suitably provided for affixing the signature of the insured, and space for affixing the date and hour of acceptance, said cards being secured together with provision for ready separation and adapted for address and mailing without further provision therefor, and a detachable coupon affixed to the cards, having printed matter thereon complementary of said cards, whereby its relation to the latter may be established, and also having thereon suitable space for affixing the date and hour of the acceptance of the policy.

3. An insurance-ticket, consisting of a postal-card, A, containing the policy, a postal-card, B, as a means of notification of acceptance, and a coupon, C, attached to and forming a connection between said cards, substantially as and for the purpose set forth.

JAMES FRANCIS LEE.

Witnesses:
JOSEPH RIDGE,
E. L. HUBER.